(12) United States Patent
Straub, Jr. et al.

(10) Patent No.: US 7,307,373 B2
(45) Date of Patent: Dec. 11, 2007

(54) TRANSDUCER ASSEMBLY FOR AN ULTRASONIC FLUID METER

(75) Inventors: Henry Charles Straub, Jr., Sugar Land, TX (US); Charles R. Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 11/301,140

(22) Filed: Dec. 12, 2005

(65) Prior Publication Data

US 2007/0035212 A1   Feb. 15, 2007

Related U.S. Application Data

(60) Provisional application No. 60/710,068, filed on Aug. 22, 2005, provisional application No. 60/707,814, filed on Aug. 12, 2005.

(51) Int. Cl.
*H01L 41/08*   (2006.01)

(52) U.S. Cl. .................................. 310/334; 310/336

(58) Field of Classification Search ................ 310/327, 310/334–337
See application file for complete search history.

(56) References Cited

U.S. PATENT DOCUMENTS

| | | | | |
|---|---|---|---|---|
| 3,775,816 A | * | 12/1973 | Gordon et al. ............. 29/25.35 |
| 4,297,607 A | * | 10/1981 | Lynnworth et al. ......... 310/334 |
| 4,482,835 A | * | 11/1984 | Bar-Cohen et al. ......... 310/327 |
| 4,556,814 A | * | 12/1985 | Ito et al. ..................... 310/334 |
| 4,649,754 A | * | 3/1987 | Zacharias ................ 73/861.18 |
| 4,909,240 A | * | 3/1990 | Helmreich et al. ............ 601/2 |
| 5,329,682 A | * | 7/1994 | Thurn et al. ................ 29/25.35 |
| 5,515,733 A | * | 5/1996 | Lynnworth ................ 73/861.27 |
| 5,987,992 A | * | 11/1999 | Watanabe et al. ............. 73/632 |

* cited by examiner

*Primary Examiner*—Mark Budd
(74) *Attorney, Agent, or Firm*—Mar E. Scott; Conley Rose, P.C.

(57) ABSTRACT

A transducer assembly for an ultrasonic fluid meter. At least some of the illustrative embodiments are transducer assemblies comprising an elongated outer housing defining an interior and an exterior, the elongated outer housing having an axis along its elongated direction, a piezoelectric element coupled to and at least partially occluding a first end of the elongated outer housing, a pin holder coupled to and at least partially occluding a second end of the elongated outer housing, the pin holder comprising a first electrical pin, and a first wire coupling the first electrical pin to the piezoelectric element (wherein the first wire runs through the interior of the elongated outer housing).

7 Claims, 7 Drawing Sheets

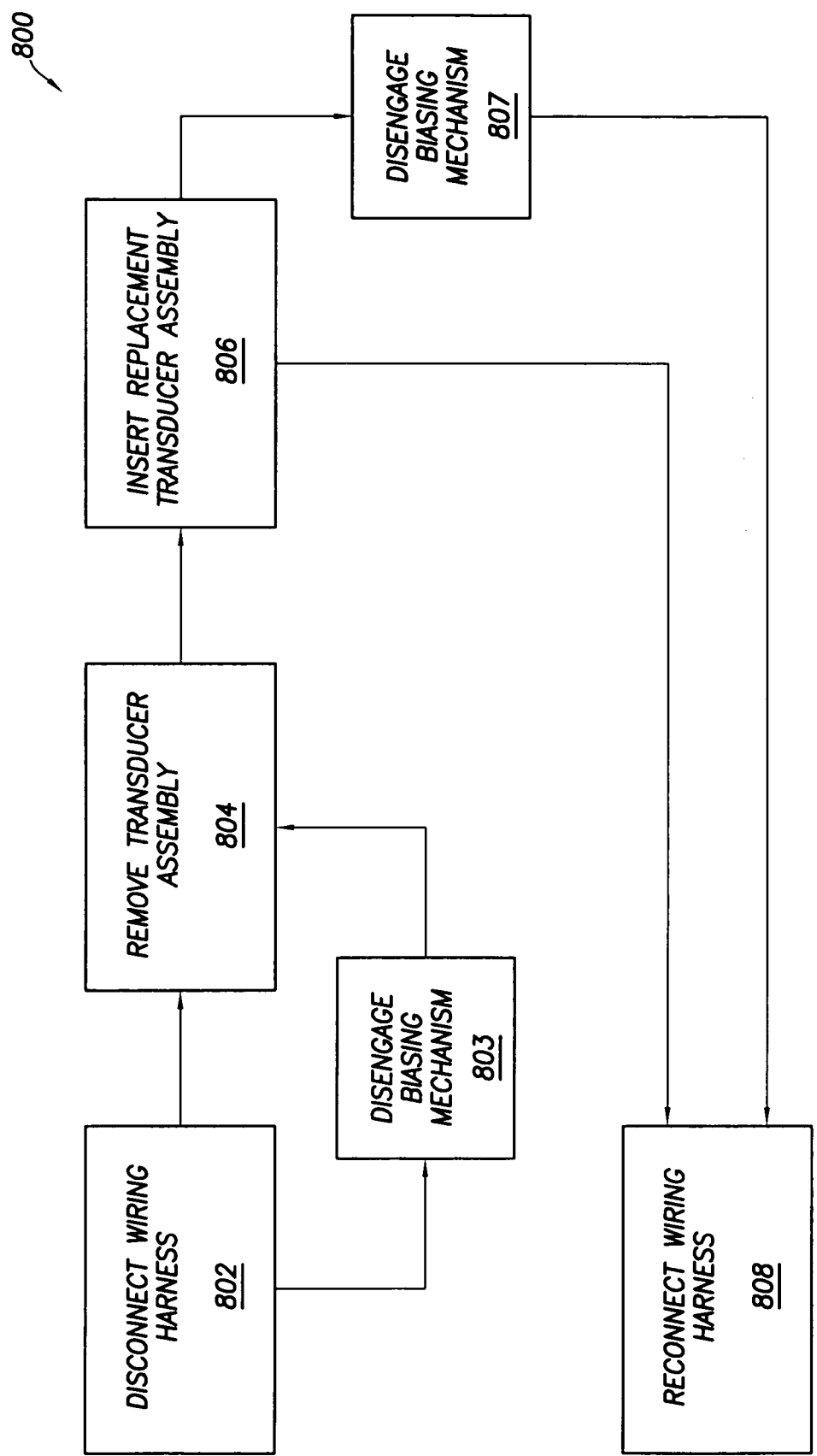

TRANSDUCER ASSEMBLY FOR AN ULTRASONIC FLUID METER

CROSS REFERENCE TO RELATED APPLICATIONS

This specification claims the benefit of provisional patent application Ser. No. 60/707,814 filed Aug. 12, 2005. This specification also claims the benefit of provisional application Ser. No. 60/710,068 filed Aug. 22, 2005. Each of these applications are incorporated by reference herein as if reproduced in full below.

STATEMENT REGARDING FEDERALLY SPONSORED RESEARCH OR DEVELOPMENT

Not Applicable.

BACKGROUND OF THE INVENTION

1. Field of the Invention

Various embodiments of the invention relate to ultrasonic flow meters.

2. Description of the Related Art

After hydrocarbons have been removed from the ground, the fluid stream (such as crude or natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Ultrasonic flow meters may be used in situations such as custody transfer. In an ultrasonic flow meter, ultrasonic signals are sent back and forth across the fluid stream to be measured, and based on various characteristics of the ultrasonic signals, a fluid flow may be calculated. Mechanisms which improve the quality of the ultrasonic signals imparted to the fluid may improve measurement accuracy. Moreover, ultrasonic flow meters may be installed in harsh environments, and thus any mechanism to reduce maintenance time, and if possible, improve performance, would be desirable.

SUMMARY

The problems noted above are addressed, at least in part, by a transducer housing for an ultrasonic fluid meter. At least some of the illustrative embodiments a transducer housing comprising a housing having a proximal end, a distal end and an internal volume, the housing couples to a spoolpiece of an ultrasonic meter, and an acoustic matching layer that fluidly seals the distal end from the internal volume (wherein the housing accepts a piezoelectric element within the internal volume and proximate to the acoustic matching layer). The acoustic matching layer has an acoustic impedance between that of the piezoelectric element and a fluid within the ultrasonic meter.

BRIEF DESCRIPTION OF THE DRAWINGS

For a more detailed description of embodiments of the invention, reference will now be made to the accompanying drawings, wherein:

FIG. 8 is a flow diagram illustrating methods of replacing a transducer assembly in accordance with embodiments of the invention.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

"Fluid" shall mean a liquid (e.g., crude oil or gasoline) or a gas (e.g., methane).

DETAILED DESCRIPTION

Figure 1A:
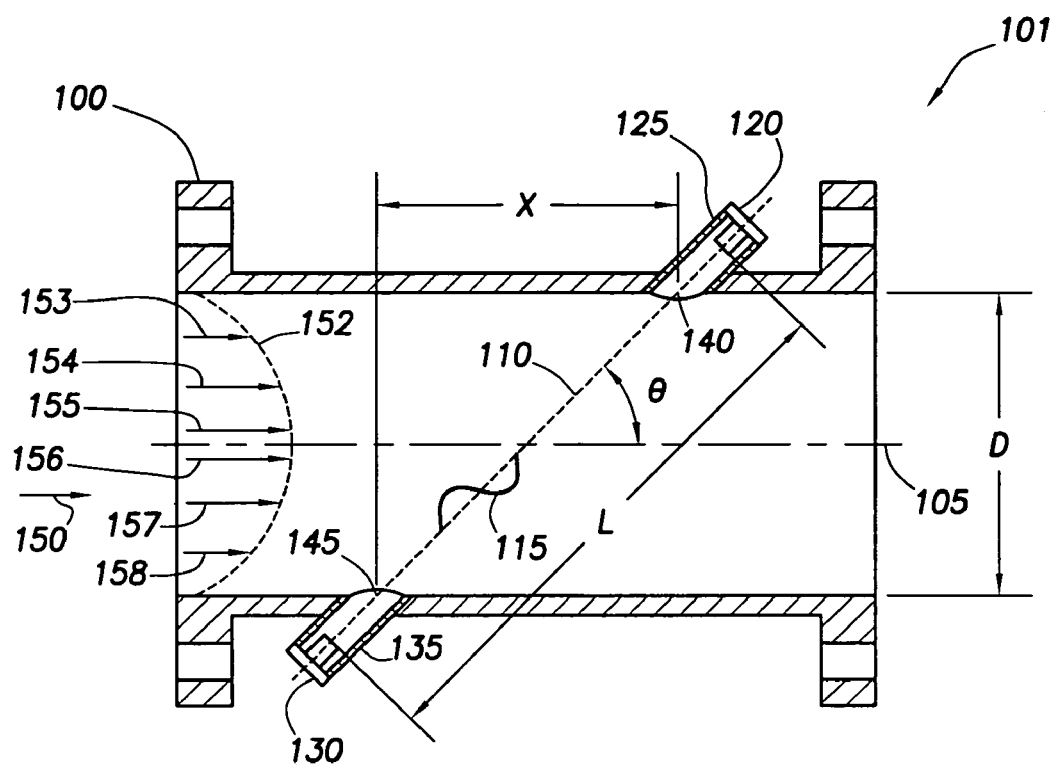
FIG. 1A is an elevational cross-sectional view of an ultrasonic flow meter.

FIG. 1A is an elevational cross-sectional view of an ultrasonic meter 101 in accordance with embodiments of the invention. Spoolpiece 100, suitable for placement between sections of a pipeline, is the housing for the meter 101. The spoolpiece 100 has an internal volume that is a flow path for a measured fluid and also has a predetermined size that defines a measurement section within the meter. A fluid may flow in a direction 150 with a velocity profile 152. Velocity vectors 153-158 illustrate that the fluid velocity through spoolpiece 100 increases toward the center.

A pair of transducers 120 and 130 is located on the circumference of the spoolpiece 100. The transducers 120 and 130 are accommodated by a transducer port 125 and 135, respectively. The position of transducers 120 and 130 may be defined by the angle θ, a first length L measured between transducers 120 and 130, a second length X corresponding to the axial distance between points 140 and 145, and a third length D corresponding to the pipe diameter. In most cases distances D, X and L are precisely determined during meter fabrication. Further, transducers such as 120 and 130 may be placed at a specific distance from points 140 and 145, respectively, regardless of meter size (i.e. spoolpiece size). Although the transducers are illustrated to be recessed slightly, in alternative embodiments the transducers protrude into the spoolpiece.

A path 110, sometimes referred to as a "chord," exists between transducers 120 and 130 at an angle θ to a centerline 105. The length L of "chord" 110 is the distance between the face of transducer 120 and the face of transducer 130. Points 140 and 145 define the locations where acoustic signals generated by transducers 120 and 130 enter and leave fluid flowing through the spoolpiece 100 (i.e. the entrance to the spoolpiece bore).

Transducers 120 and 130 are preferably ultrasonic transceivers, meaning that they both generate and receive ultrasonic signals. "Ultrasonic" in this context refers to frequencies above about 20 kilohertz. To generate an ultrasonic signal, a piezoelectric element is stimulated electrically, and it responds by vibrating. The vibration of the piezoelectric element generates an ultrasonic signal that travels through the fluid across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter. Initially, downstream transducer 120 generates an ultrasonic signal that is then received by upstream transducer 130. Some time later, the upstream transducer 130 generates a return ultrasonic signal that is subsequently received by the downstream transducer 120. Thus, the transducers 120 and 130 play "pitch and catch" with ultrasonic signals 115 along chordal path 110. During operation, this sequence may occur thousands of times per minute.

The transit time of the ultrasonic signal 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than its transit time when traveling upstream (i.e. against the flow). The upstream and downstream transit times can be used to calculate the average flow velocity along the signal path, and may also be used to calculate the speed of sound in the fluid. Knowing the cross-sectional area of the meter carrying the fluid and assuming the shape of the velocity profile, the average flow velocity over the area of the meter bore may be used to find the volume of fluid flowing through the meter 101.

Figure 1B:
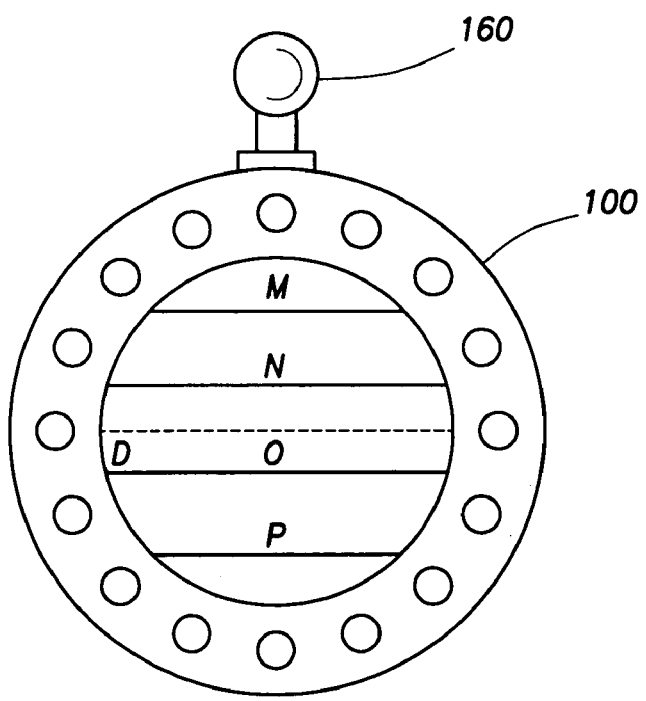
FIG. 1B is an elevational end view of a spoolpiece which illustrates chordal paths M, N, O and P.

Ultrasonic flow meters can have one or more pairs of transducers corresponding to one or more paths. FIG. 1B is an elevational end view of a spoolpiece having a diameter D. In these embodiments, spoolpiece 100 comprises four chordal paths M, N, O, and P at varying levels through the fluid flow. Each chordal path M-P corresponds to two transducers behaving alternately as a transmitter and receiver. Also shown are control electronics 160, which acquire and process data from the four chordal paths M-P. Hidden from view in FIG. 1B are the four pairs of transducers that correspond to chordal paths M-P.

Figure 1C:
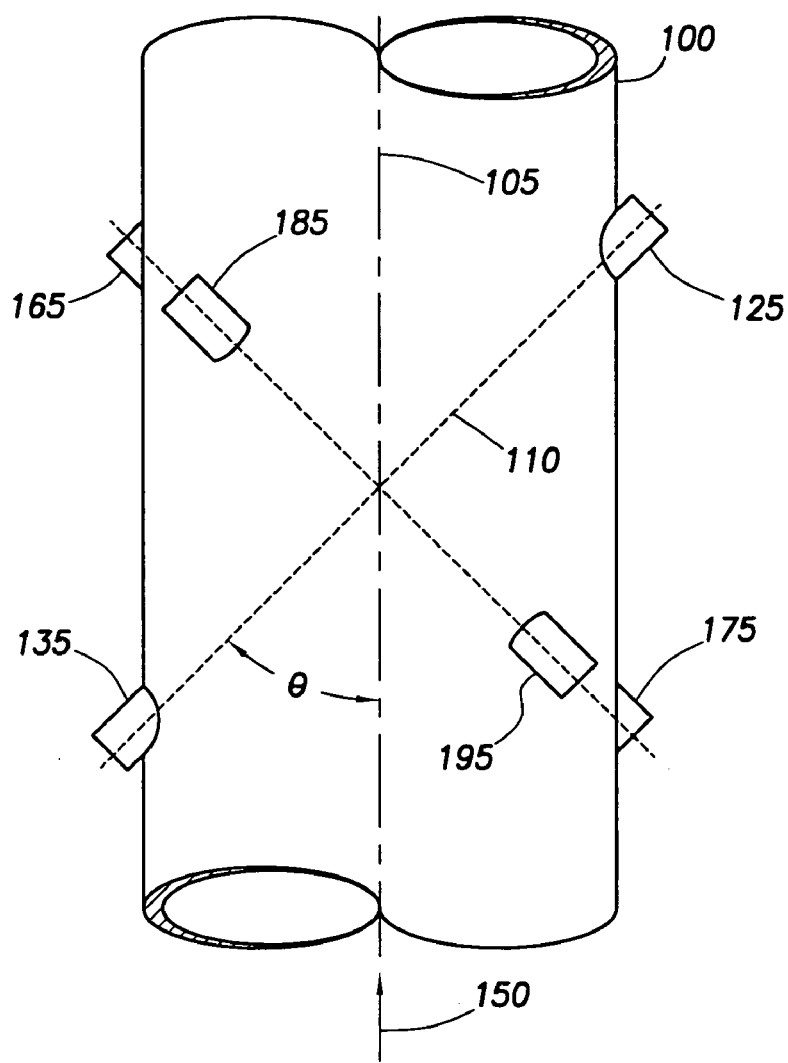
FIG. 1C is a top view of a spoolpiece housing transducer pairs.

The precise arrangement of the four pairs of transducers may be further understood by reference to FIG. 1C. In some embodiments, four pairs of transducer ports are mounted on spoolpiece 100. Each pair of transducer ports corresponds to a single chordal path of FIG. 1B. A first pair of transducer ports 125 and 135 houses transducers 120 and 130 (FIG. 1A). The transducers are mounted at a non-perpendicular angle θ to centerline 105 of spool piece 100. Another pair of transducer ports 165 and 175 (only partially in view) house associated transducers so that the chordal path loosely forms an "X" with respect to the chordal path of transducer ports 125 and 135. Similarly, transducer ports 185 and 195 may be placed parallel to transducer ports 165 and 175 but at a different "level" (i.e. a different elevation in the spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords M and N, and the lower two pairs of transducers corresponding to chords O and P. The flow velocity of the fluid may be determined at each chord M-P to obtain chordal flow velocities, and the chordal flow velocities combine to determine an average flow velocity over the entire pipe. Although four pairs of transducers are shown forming an X shape, there may be more or less than four pairs. Also, the transducers could be in the same plane or in some other configuration.

Figure 2:
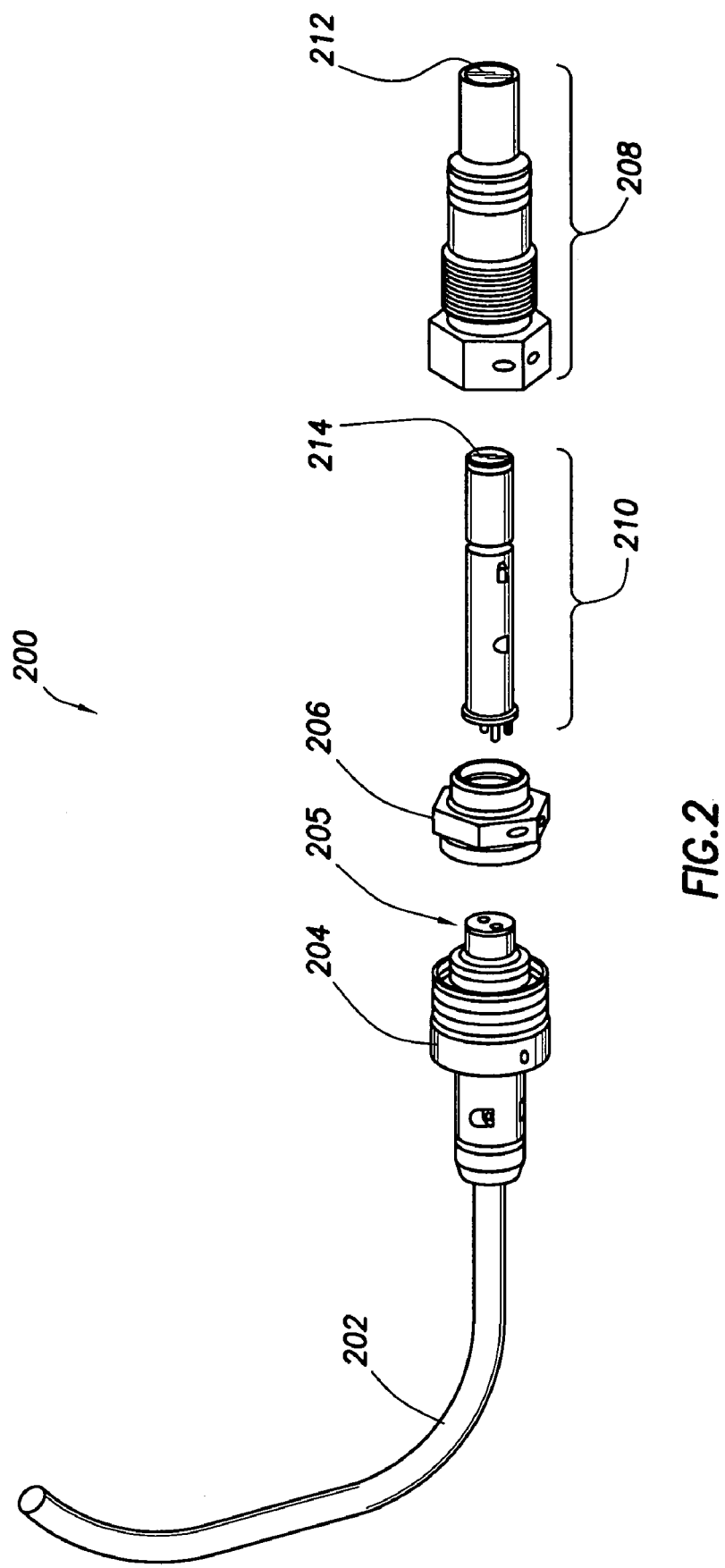
FIG. 2 illustrates an assembly in accordance with embodiments of the invention.

FIG. 2 illustrates an assembly 200 that couples to and/or within the transducer ports (e.g., 165, 175 of FIG. 1C). In particular, the assembly 200 comprises a wiring harness 202 having a connector 204 on a distal end 205 thereof. The wiring harness 202, and in particular connector 204, couple to a transducer port (not shown in FIG. 2) by way of a retaining nut 206 and transducer housing 208. The transducer assembly 210 electrically couples to the connector 204 of the wiring harness 202, and therefore the meter electronics, through an aperture in the retaining nut 206. The transducer assembly 210 telescopes into the transducer housing 208 and is held in place, at least in part, by the retaining nut 206. When the transducer assembly 210 and transducer housing 208 are engaged, a piezoelectric element 214 of the transducer assembly 210 acoustically couples to a matching layer 212. The transducer housing 208 and the transducer assembly 210 are each discussed in turn.

Figure 3:
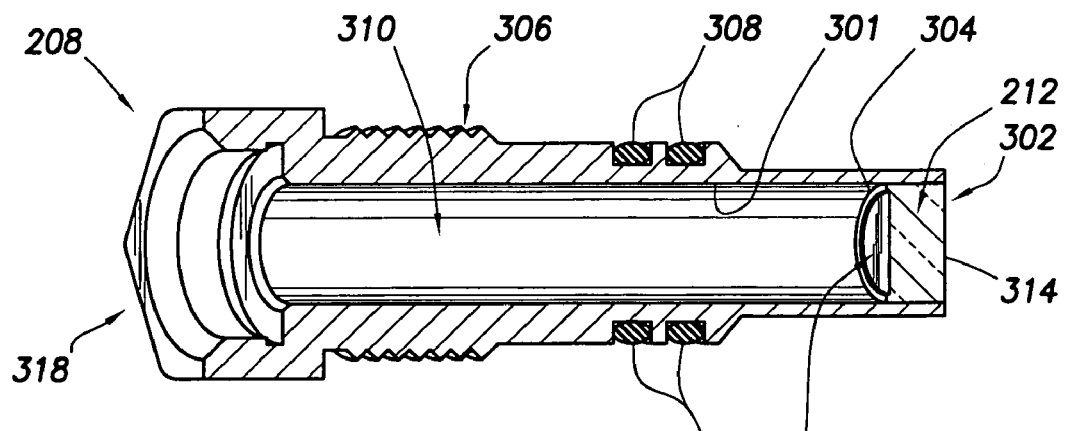
FIG. 3 illustrates a perspective cross-sectional view of a transducer housing in accordance with embodiments of the invention.

FIG. 3 shows a perspective cross-sectional view of a transducer housing 208 in accordance with embodiments of the invention. The housing 208 comprises a proximal end 318, distal end 302, and an internal volume 310. The distal end 318 is at least partially occluded by the acoustic matching layer 212. The acoustic matching layer 212 seals the distal end 302, and the exterior side 314 of the matching layer 212 is exposed to fluids flowing through the spoolpiece/meter (FIGS. 1A-C). Threads 306 on the outside diameter of the transducer housing 208 allow the housing 208 to be coupled to the spoolpiece (FIGS. 1A-C), and o-rings 308 seal the housing 208 to the transducer port (FIGS. 1A-C). In alternative embodiments, the transducer housing 208 is welded to the transducer port (FIGS. 1A-C) of the spoolpiece.

In some embodiments, the transducer housing 208 is metal such as low carbon stainless steel. In alternative embodiments any material capable of withstanding the pressure of the fluid within the meter, such as high density plastics or composite materials, may be equivalently used. In some embodiments the wall thickness of the transducer housing 208 is selected to compress slightly in response to the differential pressure between the fluid in the meter and the internal volume 310. The compression of the walls of the transducer housing 208 in these embodiments aids in holding the acoustic matching layer 212 in place. For example, the wall behind the acoustic matching layer deflects inward slightly, and the smaller inside diameter provides support to the acoustic matching layer to resist the lateral movement caused by the forces of fluid pressure within the meter. Moreover, during the process of bonding the acoustic matching layer 212 to the transducer housing 208, the housing 208 is stretched (within the elastic limit of the wall material) to accept the acoustic matching layer 212.

Figure 4:
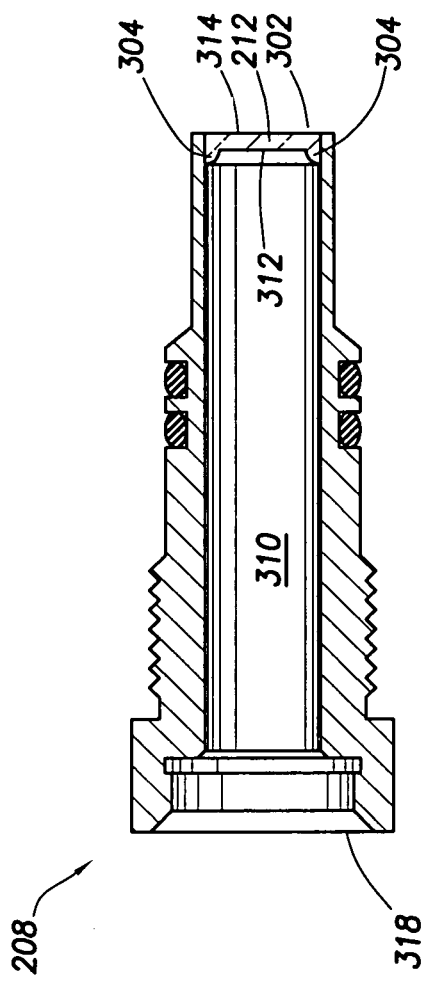
FIG. 4 illustrates an elevational cross-sectional view of a transducer housing in accordance with embodiments of the invention.

To aid in bonding the acoustic matching layer 212 to the transducer housing 208, in some embodiments the acoustic matching layer 212 has a meniscus 304 around the edge on the interior side 312. FIG. 4 illustrates an elevational cross-sectional view of the transducer housing 208 which further illustrates the meniscus 304 in accordance with these embodiments. In particular, the meniscus 304 of the acoustic matching layer 212 increases the contact area between the transducer housing wall and the acoustic matching layer 212, but preferably leaves sufficient surface area on the interior side 312 of the acoustic matching layer 212 to allow acoustic coupling between the piezoelectric element of the transducer assembly (not shown in FIG. 4). Thus, the transducer assembly 210 provides a space for the meniscus 304 to ensure that the meniscus 304 does not interfere with the coupling of the piezoelectric element to the matching layer 212.

The material of the acoustic matching layer 212 is one or more selected from the group: glass; ceramic; plastic; glass-filled plastic; or carbon-fiber filled plastic. Although some embodiments use 100% glass as the acoustic matching layer, alternative embodiments using plastic could have a glass content of 30% or less. Regardless of the material of the acoustic matching layer, the acoustic matching layer 212 provides acoustical coupling between the piezoelectric element 214 and fluid in the meter. In accordance with embodiments of the invention, the acoustic matching layer has an acoustic impedance between that of the piezoelectric element 214 and fluid within the meter. With the acoustic impedance of the matching layer between that of the piezoelectric element and the fluid in the meter, the quality of the ultrasonic signal is improved (e.g., larger amplitude and faster rise time). Glass is the preferred material for the acoustic matching layer since it has the desired acoustic impedance to provide good acoustic coupling while being strong enough to resist the pressure of the fluid within the meter so that the piezoelectric element can be isolated from the fluid in the within the meter. Comparatively, the acoustic impedance of a matching layer comprising substantially stainless steel is more than the acoustic impedance of the piezoelectric element, and therefore provides poor acoustic coupling. In some embodiments the acoustic impedance of the acoustic matching layer 212 is between about 1 and about 30 Mega-rayl (MRayl); or alternatively, between about 10 and about 15 MRayl.

When a transducer assembly 210 is inserted into the transducer housing 208, the piezoelectric element 214 (FIG. 2) of the transducer assembly 210 abuts the interior side 312 of the acoustic matching layer 212. To provide good acoustic coupling, the interior 312 and exterior 314 faces of the acoustic matching layer 212 are substantially flat and substantially parallel to one another. In some embodiments, the faces are flat to within 0.001 inch or better and parallel to within 0.003 inches or better. Additionally, the transducer assembly 210 is positioned such that the piezoelectric element 214 is centered against the acoustic matching layer 212. Transducer housings 208 with acoustic matching layers as discussed herein may be manufactured by and purchased from Dash Connector Technology of Spokane Wash.

The acoustic matching layer 212 has a thickness (along an axis shared with the remaining portions of the transducer housing 208) that in some embodiments is substantially equal to an odd multiple of one-quarter (¼, ¾, 5/4, 7/4, etc.) wavelength of the sound generated by the piezoelectric element 214. For example, consider a piezoelectric element 214 operating at a frequency of 1 MHz and an acoustic matching layer 212 with a speed of sound of 5,000 m/s. The wavelength of the sound in the matching layer is approximately 0.197 inches. In these embodiments the acoustic matching layer may be 0.049, 0.148, 0.246, 0.344, and so on, inches thick. A thinner acoustic matching layer gives better acoustical performance, but making the acoustic matching layer thicker enables the transducer housing 208 to withstand higher pressures. Picking the optimal matching layer thickness involves choosing the thinnest matching layer that can hold the highest pressures expected inside the meter.

To reduce electrical noise and double the drive voltage, it is often desirable to electrically connect the piezoelectric element differentially (discussed below), which means the portion of the piezoelectric element that abuts the acoustic matching layer may have an electrically conductive coating. If the acoustic matching layer is metallic, a thin electrical insulator is used between the metal and piezoelectric element 214 for electrical isolation. To address this concern, in some embodiments the acoustic matching layer 212 is an electrical insulator, thus reducing or eliminating the need for additional electrical insulation.

Figure 5:
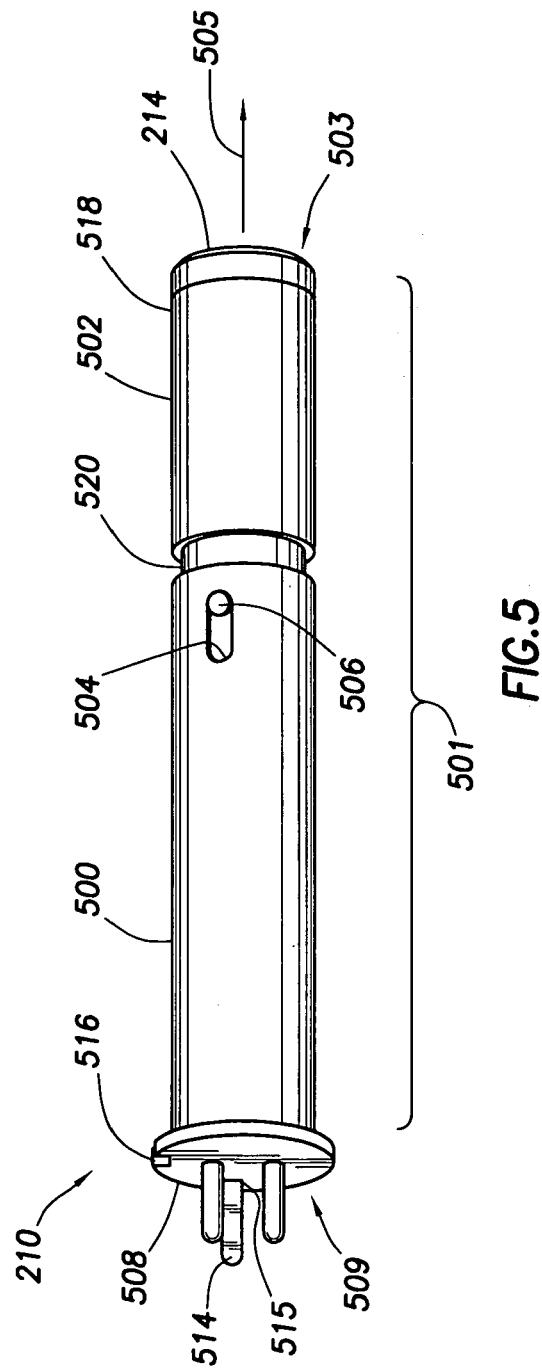
FIG. 5 illustrates an integrated transducer assembly in accordance with embodiments of the invention.

Attention now turns to the integrated transducer assembly 210. FIG. 5 illustrates a perspective view of a transducer assembly 210 in accordance with embodiments of the invention. The transducer assembly 210 comprises an elongated outer housing 501 having an axis 505 along its elongated direction. In some embodiments, the elongated outer housing 501 comprises a first portion 500 and a second portion 502, each having a common axis 505. In these embodiments, the second portion 502 telescopically couples to the first portion 500, such that the first portion 500 and second portion 502 may move relative to teach other in an axial direction. Further, the elongated outer housing 501 may be cylindrical in shape, but other shapes may be equivalently used.

In embodiments where the elongated outer housing 501 comprises a first portion 500 and second portion 502, the outside diameter of the second portion 502 at the crystal or distal end 518 is substantially the same as the first portion 500. However, the second portion 502 also comprises a reduced diameter portion 520, which telescopes within the internal diameter of the first portion 500, and thus has an outside diameter slightly smaller than the inside diameter of the first portion 500. In some embodiments, the length of engagement of the first and second portions 500 and 502 is approximately equal to the outside diameter, but longer and shorter engagements may be equivalently used. The outside diameter of the elongated outer housing 501 is slightly smaller than the inside diameter of the transducer housing 208, which helps ensure the piezoelectric element location is accurately known.

In accordance with some embodiments, the second portion 502 is made of plastic (e.g., Ultem 1000). In these embodiments the axial length of the second portion 502 is reduced (in comparison to the axial length of the first portion 500, which is preferably metallic) because the shorter length lowers manufacturing cost, but also when made of a plastic material the second portion 502 tends to absorb moisture and swell. Swelling of the second portion 502 is tolerable, and reducing the axial length of the second portion 502 enables removal of the transducer assembly 210 from the transducer housing 208 in spite of swelling.

Relative rotational movement of the first and second portions 500 and 502 and axial displacement are restricted by a pin 506 extending radially from the second portion 502 through an aperture 504 in the first portion 500. In some embodiments, three such pin and aperture combinations are used, but as few as one and greater than three of the pin and aperture combinations may be equivalently used. Alternatively, the second portion 502 may be designed to have a protrusion that interacts with the aperture 504 as an integral part of the second portion 502.

While the piezoelectric element 214 couples to and at least partially occludes the first end 503 of the elongated outer housing 501, electrical pin holder 508 couples to and at least partially occludes a second end 509 of the elongated outer housing 501. The elongated outer housing 501 first portion 500 may comprise connection key 514, which helps ensure the integrated transducer assembly is properly oriented for coupling with the connector 204 key slot. Electrical pin holder 508 may comprise a slot 515 which engages the connection key 514 preventing rotation of the electrical pin holder 508 within the elongated outer housing 501. Additionally, the electrical pin holder 508 may further comprise an anti-rotation slot 516 which, in combination with a tab on the transducer housing 208, keeps the integrated transducer assembly 210 from rotating in the transducer housing 208. The second end 509 of the elongated outer housing 501 has an internal diameter that is a sliding fit to a small outside diameter of the pin holder 508. The pin holder 508 may desirably be made from Ultem 1000, but any rigid, non-conducting material can be used.

Figure 6:
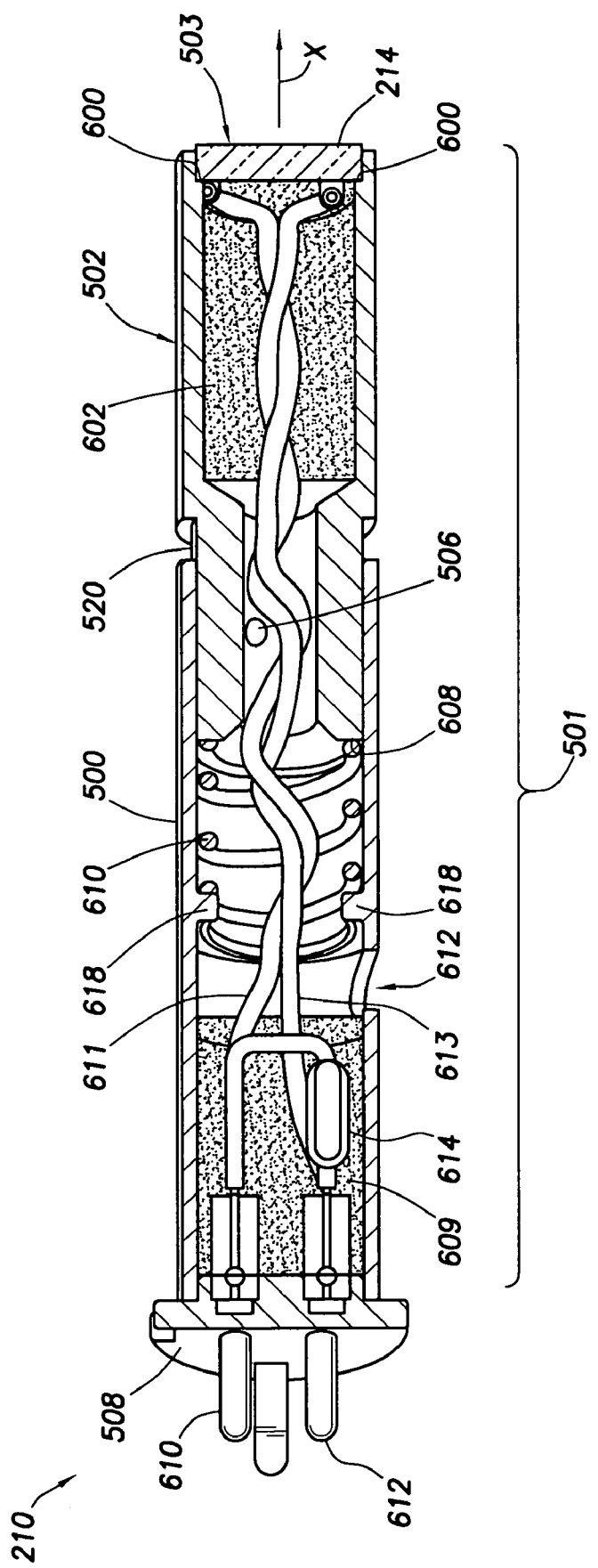
FIG. 6 illustrates a perspective cross-sectional view of an integrated transducer assembly in accordance with embodiments of the invention.

FIG. 6 illustrates a perspective cross-sectional view of the transducer assembly 210. In at least some embodiments, the piezoelectric element 214 is electrically isolated from the transducer housing 208, and thus at least the second portion 502 is made of a rigid non-conducting material as discussed above. The inside diameter of the elongated outer housing 501 and the outside diameter of the piezoelectric element 214 are selected such that there is space between the transducer assembly 210 and the transducer housing 208 into which the transducer assembly 210 is inserted. This space provides room for clearance for the meniscus 304 (of FIGS. 3 and 4) of the acoustic matching layer. This space also provides room for excess oil or grease that may be applied to the piezoelectric element's 214 exterior surface prior to insertion into the transducer housing 208 in order to improve acoustic coupling of the piezoelectric element 214 and acoustic matching layer 212.

A shoulder 600 in the elongated outer housing 501 abuts the piezoelectric element 214 to resist axial movement of the piezoelectric element, such as axial movement caused by forces imparted when the transducer assembly 210 is mounted within the transducer housing 208. The volume behind the piezoelectric element 214 comprises a back matching layer 602 (e.g., epoxy, powder-filled epoxy, rubber, powder-filled rubber), and serves several purposes. For example, the back matching layer couples the piezoelectric element 214, and one or more wires attached to the piezoelectric element 214, to the elongated outer housing 501. In particular, the mass of the back matching layer improves the acoustic output of the piezoelectric element 214 by reducing ringing and increasing bandwidth of the acoustic signal. In some embodiments, the length of the back matching layer (measured along the axis of the elongated outer housing) is selected such that the round trip travel time of an ultrasonic signal in the back matching layer 602 occurs at a time greater than the time of measurement of a received signal. For example, if the fourth zero crossing in the received signal is used as the measurement point, then the round trip travel time would preferably be greater than two cycles at the center frequency of operation of the piezoelectric element. Alternatively, the length of the back matching layer 602 is from about 1 to about 9 wavelengths of sound in the back matching layer at the center frequency of operation of the piezoelectric element. The appropriate length ensures that any reflected acoustic signals do not arrive at the piezoelectric element during the ultrasonic meter's signal transit timing.

Considering further the elongated outer housing 501 comprising a first portion 500 and second portion 502, the reduced diameter portion 520 of the second portion 502 comprises a shoulder 608. The shoulder is small enough to allow passage for wires through an aperture therein, and to allow an opening for injecting the back matching layer 602. The back matching layer may be injected with a syringe with a small plastic tip. Chamfers are provided on the ends of this shoulder 608 to ensure no sharp edge is created which could damage wires. The shoulder 608 is a location upon which a biasing mechanism (discussed below) may push when biasing the second portion 502.

In embodiments where the elongated outer housing 501 comprises a first portion 500 and second portion 502 that are allowed to move axially relative to each other, the transducer assembly 210 comprises a biasing mechanism, such as spring 610. The biasing mechanism biases the first portion 500 and second portion 502 away from each other along the common axis X. The force with which the biasing mechanism biases the first portion 500 and second portion 502 away from each other is, in some embodiments, from about 4 to about 12 pounds. In alternative embodiments, the biasing mechanism may be any mechanism to provide the biasing force, such as a washer, a piece of rubber, or combinations of springs, washers and/or pieces of rubber.

Spring 610 is slightly compressed against shoulder 618 during assembly and at least one pin (partially shown at 506) an aperture combination (FIG. 5) limit axial and rotational movement of the second portion 502 within the first portion 500. Once the transducer assembly 210 is installed the transducer housing 208, the retaining nut 206 (FIG. 2) further compresses the spring 610. This compression compensates for the tolerances of the assembled parts to ensure that the exterior side of the piezoelectric element 214 is in good contact to the interior side 312 of the acoustic matching layer 212 (FIG. 4). Once the connector 204 (FIG. 2) is assembled the spring 610 may be compressed further. The spring force may be on the order of 4.9 pounds once the connector 204 is in place. In alternative embodiments, the connector 204 need not apply further compressive force on the spring. In embodiments where the elongated outer housing 501 is a single structure, the force to ensure good coupling between the piezoelectric element 214 and the acoustic matching layer 212 (FIG. 4) may be supplied by the retaining nut 206 (FIG. 2) and/or the connector 204 (FIG. 2).

The pin holder 508 holds two connection pins 610 and 612 at the desired spacing and exposed length. The pins mate with the connector 204, providing electrical connection of the transducer assembly with the electronics of the meter. Electrical pin 610 couples to the piezoelectric element 214 by way of a first wire 611 that runs through the interior of the elongated outer housing 501 Likewise, second pin 612 couples to the piezoelectric element 214 by way of second wire 613 that also runs through the interior of the housing 501. In some embodiments, multi-strand copper wire with PTFE insulation is used for wires 611, 613, but other types of wire may be equivalently used. In order to hold the wires 611 and 613 in place, as well as possibly the resistor 614 (discussed below) and electric pin holder 508, an adhesive 609 such as epoxy is inserted through the epoxy fill port 612. In some embodiments, the connection pins 610 and 612 are robust gold plated brass pins which have solder connection pockets, but other pins may be equivalently used. Two different colors of wire insulation are used to ensure the correct polarity of the crystal faces and connection pin orientation with the connection key on the case are maintained during manufacturing. The wires are twisted during assembly to ensure that any induced electrical signals in the wires are equalized to avoid such signals from interfering with crystal impulses during measurement cycles.

A one mega ohm resistor 614 couples between the pins 610 and 612, thus coupling the two electrode plated faces (discussed below) of the piezoelectric crystal. This resistor 614 provides a short at low frequencies to discharge any electrical energy generated by mechanical shock or temperature changes during transportation or installation. At the high frequency (~1 MHz) of operation of the transducer, the resistor 614 has virtually no effect on the electrical signal sent to or generated by the piezoelectric crystal. One lead of the resistor is insulated by insulation tubing to avoid shorting of this lead to the case during manufacturing. Alterative transducer designs may comprise additional electrical components within the integrated transducer assembly (e.g., inductors, amplifiers, switches, zener diodes, or capacitors). The use of these components may be individually or in many combinations.

Figure 7B:
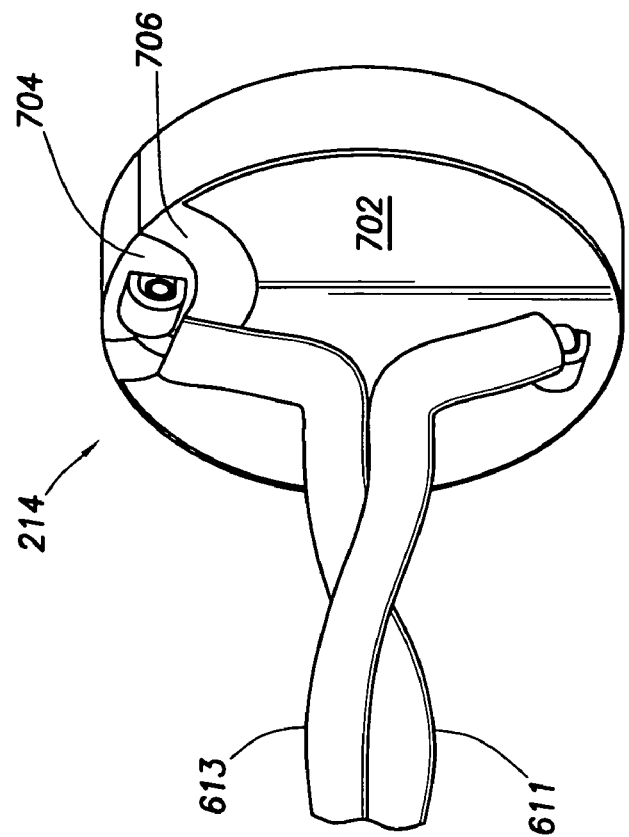
FIG. 7B illustrates a perspective view of the back face of a piezoelectric element in accordance with embodiments of the invention.
Figure 7A:
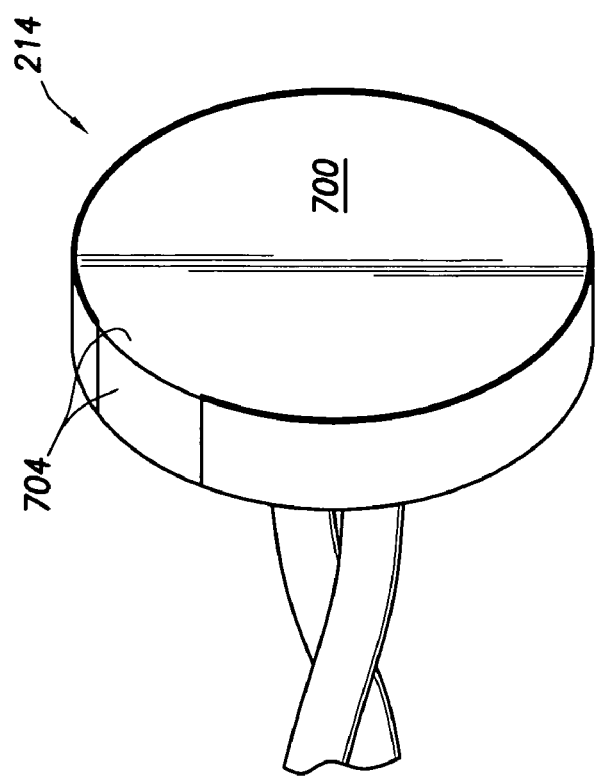
FIG. 7A illustrates a perspective view of the front face of a piezoelectric element in accordance with embodiments of the invention.

FIGS. 7A and 7B illustrate electrical coupling to the piezoelectric element 214 in accordance with embodiments of the invention. In some embodiments, the piezoelectric element 214 is a piezoelectric crystal, such as PZT-5A or other similar material. The thickness and diameter of the crystal controls the frequency of the ultrasonic signal that is emitted. The exterior side 700 is the side of the piezoelectric element 214 that couples to the acoustic matching layer (FIGS. 3 and 4). The exterior side 700 and interior side 702 of the piezoelectric element are at least partially plated with silver or other metals to create electrode surfaces. A portion 704 of the plating on the exterior side 700 extends around the periphery of the crystal to the interior side 702. The plating of the exterior side 700 (comprising the portion 704) and the plating of the interior side 702 are electrically isolated by a region 706 having no plating. Plating in this manner enables coupling of both wires 611 and 613 to the interior side 702 of the piezoelectric element 214. The plating arrangement as illustrated allows the exterior side 700 to be flat for good contact to the acoustic matching layer. Alternatively, one wire may extend around the piezoelectric element and couple to the exterior side 700. In these embodiments, a portion of the housing 501 (FIGS. 5 and 6) is notched to allow passage of the wire. Moreover, in these embodiments where one of the wires couples directly to the exterior surface 700, the acoustic matching layer 214 is notched to accommodate the wire. In yet further embodiments, a first wire couples to the interior side 702 of the piezoelectric element and the second wire couples to the periphery or edge of the piezoelectric element.

The transducer assembly 210 design greatly simplifies transducer assembly installation and replacement, particularly at pipeline facilities where conditions (lightning, weather, and the like) are less than ideal. Referring to the flow diagram in FIG. 8, in various embodiments a method 800 of replacing the transducer assembly comprises disconnecting the wiring harness (block 802) that electronically couples the electronics of the ultrasonic meter (FIGS. 1A-C) to the transducer assembly 210. If used, the biasing mechanism is disengaged (block 803), such as by loosening and removing nut 206 (FIG. 2). Thereafter, the transducer assembly 804 is removed as a single unit (block 804) from the transducer housing 208. A replacement transducer assembly is inserted into the transducer housing (block 806), again as a single unit. In some embodiments, the biasing mechanism is engaged (block 807), such as by installing retaining nut 206. Finally, the wiring harness is reconnected (block 808).

While various embodiments of this invention have been shown and described, modifications thereof can be made by one skilled in the art without departing from the spirit or teaching of this invention. The embodiments described herein are exemplary only and are not limiting. Accordingly, the scope of protection is not limited to the embodiments described herein, but is only limited by the claims which follow, the scope of which shall include all equivalents of the subject matter of the claims.

What is claimed is:

1. A transducer assembly comprising:
   an elongated outer housing comprising:
   a first portion and a second portion, wherein the second portion telescopically couples to the first portion; and
   a biasing mechanism coupled to the elongated outer housing, wherein the biasing mechanism is configured to bias the first portion and second portion away from each other along an axis in an elongated direction of the housing;
   a piezoelectric element coupled to and at least partially occluding a first end of the elongated outer housing;
   a pin holder coupled to and at least partially occluding a second end of the elongated outer housing, the pin holder comprising a first electrical pin; and
   a first wire that couples the first electrical pin to the piezoelectric element, wherein the first wire runs through the interior of the elongated outer housing.

2. The assembly of claim 1 wherein the biasing mechanism is configured to supply a force from about 4 to about 12 pounds.

3. The assembly of claim 1 wherein the biasing mechanism further comprises a spring.

4. A transducer assembly comprising:
   an elongated outer housing comprising:
   a first portion and a second portion, wherein the second portion telescopically couples to the first portion;
   an aperture through the first portion; and
   a pin extending radially outward from the second portion, the pin extending through the aperture;
   wherein the pin and the aperture are configured to limit telescopic movement of the first portion relative to the second portion;
   a piezoelectric element coupled to and at least partially occluding a first end of the elongated outer housing;
   a pin holder coupled to and at least partially occluding a second end of the elongated outer housing, the pin holder comprising a first electrical pin; and
   a first wire that couples the first electrical pin to the piezoelectric element, wherein the first wire runs through the interior of the elongated outer housing.

5. A transducer assembly comprising:
   an elongated outer housing defining an interior and an exterior, the elongated outer housing having an axis along its elongated direction;
   a piezoelectric element coupled to and at least partially occluding a first end of the elongated outer housing;
   a pin holder coupled to and at least partially occluding a second end of the elongated outer housing, the pin holder comprising a first electrical pin and a second electrical pin;
   a first wire that couples the first electrical pin to the piezoelectric element, wherein the first wire runs through the interior of the elongated outer housing;

a second wire that couples the second electrical pin to the piezoelectric element; and a notch in the elongated outer housing to accommodate one or more wires coupled to an exterior side of the piezoelectric element.

6. An ultrasonic meter comprising:

a spool piece with an internal flow path for a measured fluid;

at least two transducer housings in operational relationship in the spool piece; and a transducer assembly coupled to one of the at least two transducer housings, wherein the transducer assembly comprises:

an elongated outer housing comprising a first portion and a second portion, the second portion telescopically couples to the first portion along an axis, and wherein the elongated outer housing defines an interior, an exterior, and the axis along its elongated direction;

a piezoelectric element coupled to and at least partially occluding a first end of the elongated outer housing;

a pin holder coupled to and at least partially occluding a second end of the elongated outer housing, the pin holder comprising a first electrical pin;

a first wire that couples the first electrical pin to the piezoelectric element, wherein the first wire runs through the interior of the elongated outer housing; and a biasing mechanism coupled to the elongated outer housing, wherein the biasing mechanism biases the first portion and second portion away from each other along the axis.

7. The ultrasonic meter of claim 6 wherein the biasing mechanism is one selected from the group consisting of: a spring; a washer; a piece of rubber; or combinations thereof.

* * * * *